(12) United States Patent
Park et al.

(10) Patent No.: US 8,481,875 B2
(45) Date of Patent: Jul. 9, 2013

(54) PLUG INTERLOCK DEVICE FOR VACUUM CIRCUIT BREAKER

(75) Inventors: Woo-Jin Park, Chungcheongbuk-Do (KR); Chen Xin Liu, Chungcheongbuk-Do (KR)

(73) Assignee: LS Industrial Systems Co., Ltd., Anyang-Si, Gyeonggi-Do (KR)

( * ) Notice: Subject to any disclaimer, the term of this patent is extended or adjusted under 35 U.S.C. 154(b) by 239 days.

(21) Appl. No.: 13/070,387

(22) Filed: Mar. 23, 2011

(65) Prior Publication Data

US 2011/0233034 A1    Sep. 29, 2011

(30) Foreign Application Priority Data

Mar. 23, 2010    (KR) .................. 10-2010-0025951

(51) Int. Cl.
*H01H 9/00*    (2006.01)
*H01H 11/00*    (2006.01)

(52) U.S. Cl.
USPC ........................................... 200/50.27

(58) Field of Classification Search
USPC .......... 200/50.21–50.27, 43.11, 50.01, 50.03, 200/17 R, 43.01, 43.16
See application file for complete search history.

(56) References Cited

U.S. PATENT DOCUMENTS

| | | | | |
|---|---|---|---|---|
| 4,486,814 A | * | 12/1984 | Ishikawa et al. | 361/609 |
| 5,206,468 A | | 4/1993 | Kobayashi et al. | |
| 7,821,775 B2 | * | 10/2010 | Narayanasamy et al. | 361/609 |
| 2006/0118397 A1 | | 6/2006 | Dahl et al. | |

FOREIGN PATENT DOCUMENTS

| | | |
|---|---|---|
| JP | 63-36109 | 3/1988 |
| JP | 2-273008 | 11/1990 |
| JP | 3-63008 | 6/1991 |
| JP | 3-235604 | 10/1991 |
| JP | 4-42709 | 2/1992 |
| JP | 6-82741 | 11/1994 |
| JP | 2010-27486 | 2/2010 |
| KR | 20-1999-0034272 | 8/1999 |
| KR | 10-0364827 | 12/2002 |
| RU | 2368045 | 9/2009 |
| SU | 80617 | 8/1948 |

OTHER PUBLICATIONS

Japan Patent Office Application Serial No. 2011-063052, Office Action dated Sep. 18, 2012, 3 pages.

* cited by examiner

*Primary Examiner* — Edwin A. Leon
*Assistant Examiner* — Anthony R. Jimenez
(74) *Attorney, Agent, or Firm* — Lee, Hong, Degerman, Kang & Waimey (57) ABSTRACT

Disclosed is a plug interlock device for a vacuum circuit breaker. Only after a plug is completely mounted to a connector, an insertion or withdrawal operation by a vacuum circuit breaker is performed. Accordingly, while a breaker body is moved to a 'RUN' position from a 'TEST' position, or when an operation is performed at a 'RUN' position, the plug may be prevented from being separated from the connector. This may prevent an accident.

11 Claims, 7 Drawing Sheets

PLUG INTERLOCK DEVICE FOR VACUUM CIRCUIT BREAKER

CROSS-REFERENCE TO RELATED APPLICATION

Pursuant to 35 U.S.C. §119(a), this application claims the benefit of earlier filing date and right of priority to Korean Application No. 10-2010-0025951, filed on Mar. 23, 2010, the contents of which is incorporated by reference herein in its entirety.

BACKGROUND OF THE INVENTION

1. Field of the Invention

This specification relates to a plug interlock device for a vacuum circuit breaker.

2. Background of the Invention

Generally, a circuit breaker may be classified into a fixed type and a withdrawable type. The fixed type circuit breaker has only a body, and is fixed to inside of a panel of a switchboard. On the contrary, the withdrawable type circuit breaker has an outer case such as a cradle for facilitation of maintenance and repair, and is configured to insert or withdraw only a breaker body thereinto or therefrom.

The withdrawable type circuit breaker (hereinafter, will be referred to as 'circuit breaker') is accommodated in a switchboard together with other electric devices so as to drive a power plant, a substation, an electric motor, etc.

The circuit breaker may be configured such that the breaker body thereof is electrically connected to or separated from the cradle fixed to a switchboard. According to an accommodation position of the breaker body in the cradle, a position of the circuit breaker may be categorized into a 'TEST' position and a 'RUN' position. More concretely, the 'TEST' position indicates a position where only an operation test for the circuit breaker can be performed as a bus bar terminal and a load terminal of the breaker body are separated from a bus bar terminal and a load terminal of the cradle. On the contrary, the 'RUN' position indicates a position where a voltage and a current can be supplied as the bus bar terminal and the load terminal of the breaker body are connected to the bus bar terminal and the load terminal of the cradle.

In order to implement ON/OFF operations of the circuit breaker by transmitting an electric signal to the circuit breaker on a 'RUN' position or a 'TEST' position of the breaker body, required is an apparatus for applying power to the breaker body. To this end, a control power plug is installed at the switchboard, and a control power connector for connecting or disconnecting the control power plug is installed at the breaker body. If the breaker body is inserted into or withdrawn from the cradle in a state that the control power plug is not connected to the control power connector, or if the control power plug is disconnected from the control power connector on a 'RUN' position, the circuit breaker is not operated even if emergent situations occur. This may cause an accident. Accordingly, the circuit breaker has to be configured so that the control power plug may not be disconnected from the control power connector on a 'RUN' position or when the breaker body is inserted into or withdrawn from the cradle.

However, the conventional circuit breaker is not provided with an additional plug interlock device for a vacuum circuit breaker capable of preventing the control power plug from being disconnected from the control power connector on a 'RUN' position or when the breaker body is moved to a 'RUN' position from a 'TEST' position. As a result, a user may disconnect the control power plug form the control power connector by mistake on a 'RUN' position or when the breaker body is moved. This may cause an accident.

SUMMARY OF THE INVENTION

Therefore, an aspect of the detailed description is to provide a plug interlock device for a vacuum circuit breaker capable of preventing the occurrence of an accident by preventing a control power plug from being disconnected from a control power connector when the circuit breaker is on a 'RUN' position or when a breaker body is moving.

To achieve these and other advantages and in accordance with the purpose of this specification, as embodied and broadly described herein, there is provided a plug interlock device for a vacuum circuit breaker, including a switchboard having a control power plug, a breaker body having a control power connector for detachably connecting the control power plug, and having terminals for receiving a voltage and a current, a cradle installed at the switchboard and having terminals connected to or disconnected from the terminals of the breaker body, a carriage having the breaker body thereon and slidably installed at the cradle, and a carriage restriction unit configured to selectively restrict a motion of the carriage by interworking with an operation to insert or separate the control power plug into/from the control power connector, wherein the carriage restriction unit includes a link up-down moving along an insertion or separation direction of the control power plug, a rotation lever rotatably coupled to the link and rotated in a forward or backward direction with respect to the up-down moving direction of the link, and a blocking plate rotatably coupled to the rotation lever, and configured to restrict a motion of the carriage or release a restricted state of the carriage with moving in a direction perpendicular to a moving direction of the carriage according to a rotation direction of the rotation lever.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIGS. 5 to 7 are views showing states of the plug interlock device of the present invention according to different positions, in which FIG. 5 shows a 'PRE-TEST' position, FIG. 6 shows a 'TEST' position, and FIG. 7 shows a 'RUN' position.

DETAILED DESCRIPTION OF THE INVENTION

Description will now be given in detail of the exemplary embodiments, with reference to the accompanying drawings.

For the sake of brief description with reference to the drawings, the same or equivalent components will be provided with the same reference numbers, and description thereof will not be repeated.

Hereinafter, a plug interlock device for a vacuum circuit breaker according to the present invention will be explained in more details with reference to the attached drawings.

Figure 1:
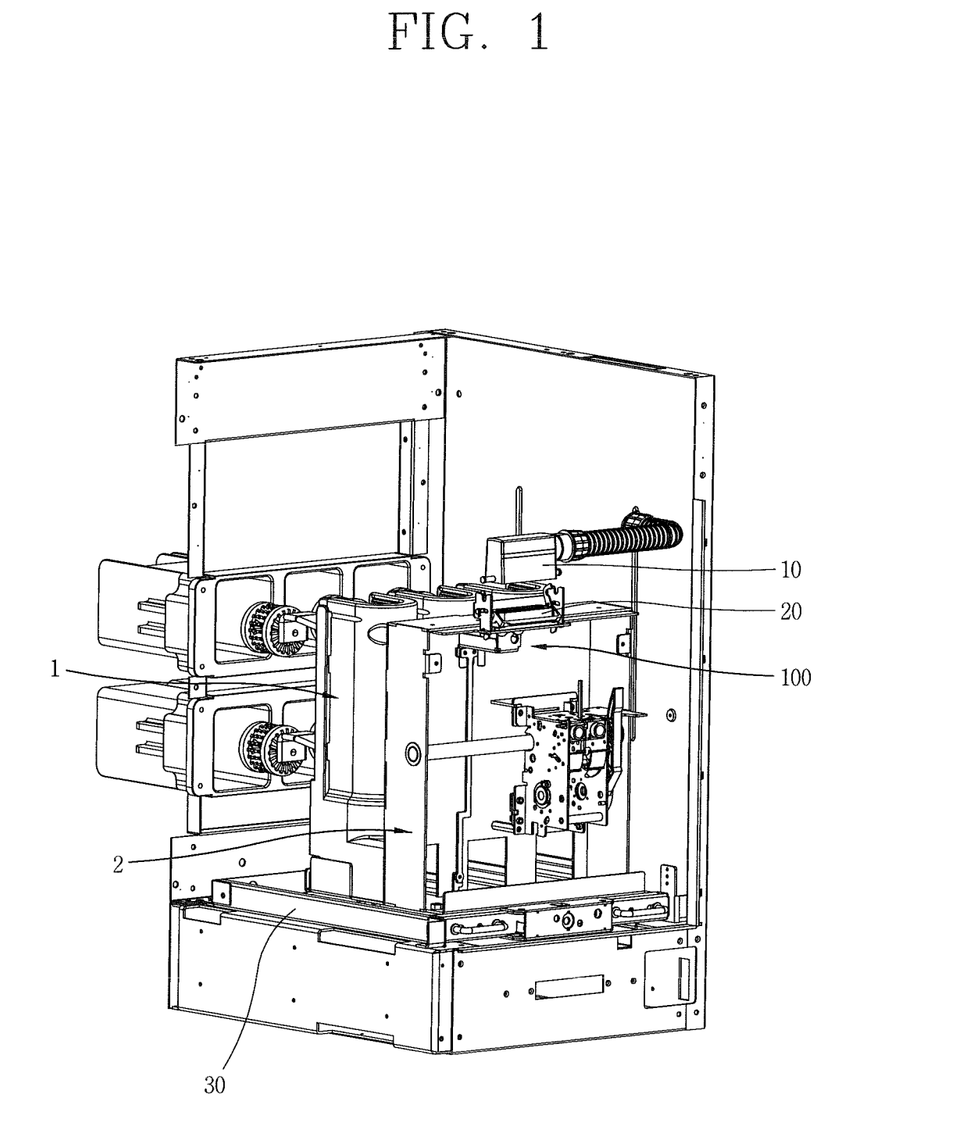
FIG. 1 is a perspective view of a circuit breaker having a plug interlock device according to the present invention.
Figure 2:
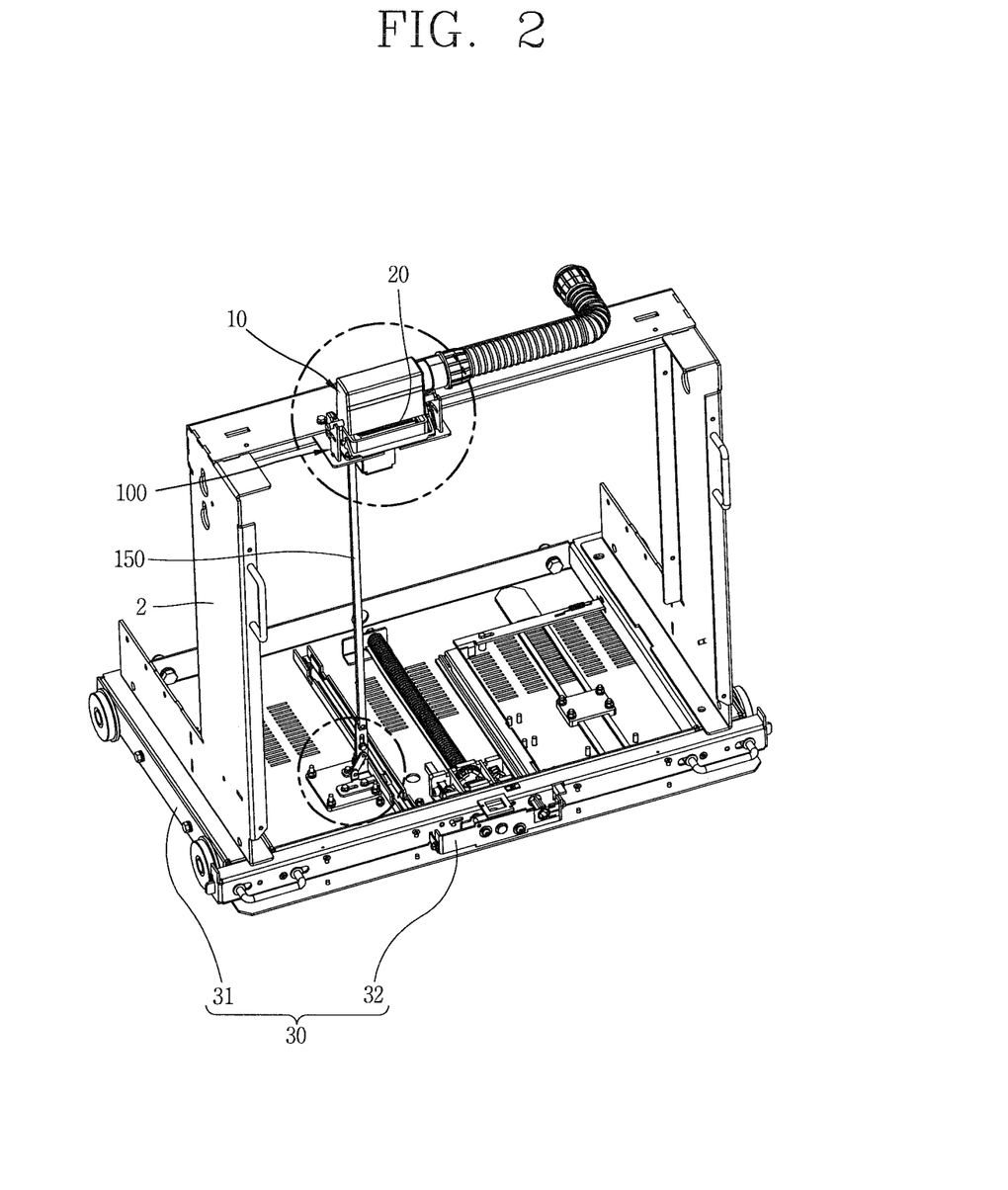
FIG. 2 is a perspective view of the plug interlock device of FIG. 1.
Figure 3:
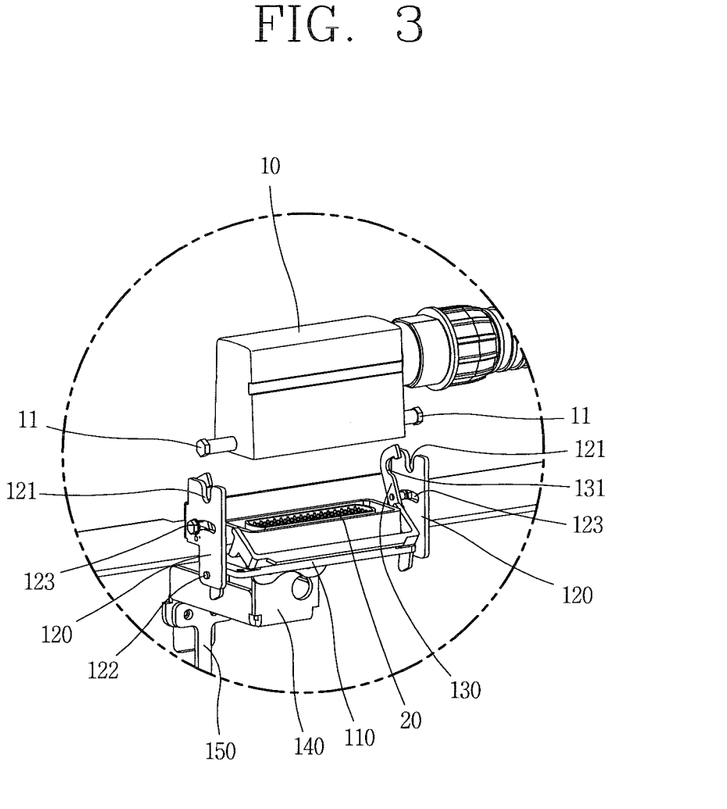
FIG. 3 is a perspective view of a plug restriction unit of the plug interlock device of FIG. 2.
Figure 4:
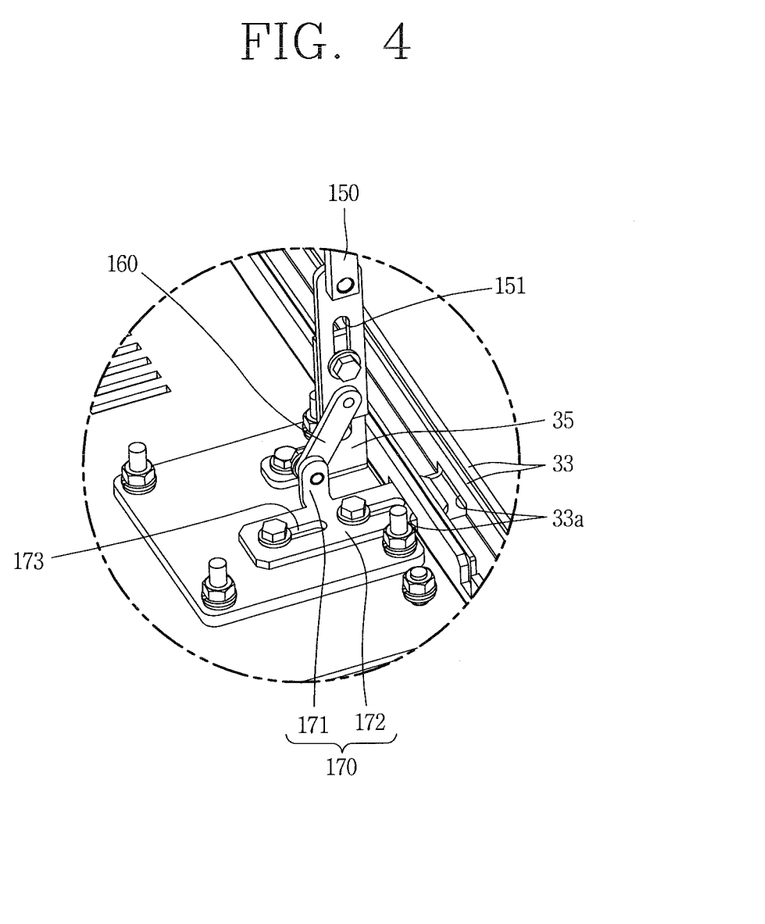
FIG. 4 is a perspective view of a body restriction unit of the plug interlock device of FIG. 2.

FIG. 1 is a perspective view of a circuit breaker having a plug interlock device according to the present invention, FIG. 2 is a perspective view of the plug interlock device of FIG. 1, FIG. 3 is a perspective view of a plug restriction unit of the plug interlock device of FIG. 2, and FIG. 4 is a perspective view of a body restriction unit of the plug interlock device of FIG. 2.

As shown in FIG. 1, the circuit breaker having a plug interlock device according to the present invention is accommodated in a switchboard 1 together with other electric devices so as to drive a power plant, a substation, an electric motor, etc.

A cradle 2 having a bus bar terminal and a load terminal is fixed to the switchboard 1, and a breaker body 3 is accommodated in the cradle 2 in a withdrawable manner with a loaded state on the carriage 30. The breaker body 3 is provided with a bus bar terminal and a load terminal so as to be selectively coupled to the bus bar terminal and the load terminal of the cradle 2, respectively.

On the switchboard 1, installed is a control power plug (hereinafter, will be referred to as 'plug') 10 for supplying power by transmitting an electric signal to the circuit breaker on a 'TEST' position and a 'RUN' position so that the circuit breaker can perform an ON/OFF operation. A control power connector (hereinafter, will be referred to as 'connector') 20 selectively connected to the plug 10 is installed at the breaker body 3 of the circuit breaker.

Between the breaker body 3 and the carriage 4, installed is a plug interlock unit (hereinafter, will be referred to as 'interlock unit') 100 configured to lock or unlock the plug 10 and the connector 20 when the plug 10 is coupled to the connector 20.

As shown in FIGS. 2 to 4, the interlock unit 100 includes a fixing plate 110 fixedly installed at the circuit body 3 and configured to support the connector 20, plug brackets 120 moveably coupled to both sides of the fixing plate 110 in a longitudinal direction, i.e., in an insertion direction of the plug 10, locking latches 130 rotatably coupled to the plug brackets 120 and configured to lock pins 11 of the plug 10, a connection link 140 coupled to the plug brackets 120 and moving together with the plug brackets 120, a sliding link 150 moving in a longitudinal direction by the connection link 140, a rotation lever 160 rotatably coupled to the sliding link 150 and rotated in a forward or reverse direction with respect to an up-down moving direction of the sliding link 150, i.e., a forward direction and a backward direction, and a blocking plate 170 rotatably coupled to the rotation lever 160, and configured to restrict a motion of the carriage 30 or to release a restricted state of the carriage 30 with moving in a direction perpendicular to a moving direction of the carriage 30 according to a rotation direction of the rotation lever 160.

The fixing plate 110 is formed to have a shape of an approximate rectangular plate, and the connector 20 may be fixedly installed at the center of the fixing plate 110. At both side surfaces of the fixing plate 110, may be formed guiding recesses (not shown) configured to slidably insert the locking latches 130 therein and to slidably rotate the locking latches 130 in a longitudinal direction. Although not shown, the guiding recesses may be replaced by guiding protrusions having a rib shape.

The plug brackets 120 are disposed at both sides of the fixing plate 110 and are connected to each other so as to be moveable in a longitudinal direction with respect to the fixing plate 110. On upper surfaces of the plug brackets 120, formed are pin recesses 121 configured to insert the pins 11 of the plug 10. On lower surfaces of the plug brackets 120, formed are hinge holes 122 configured to rotatably couple the locking latches 130. At an intermediate part between the pin recesses 121 and the hinge holes 122, formed are sliding holes 123 configured to restrict a rotation angle of the locking latches 130 so that the locking latches 130 can rotate within a constant angle.

Upper ends of the locking latches 130 are provided with locking portions 131 having a hook shape, lower ends thereof are rotatably coupled to the hinge holes 122 of the plug brackets 120, and intermediate parts thereof are slidably coupled to the sliding holes 123 of the plug brackets 120.

The connection link 140 is formed to be long in a horizontal direction, and is formed to contact the plug brackets 120 so as to be downwardly moved together with the plug brackets 120 when the plug brackets 120 are pressed.

The sliding link 150 is formed to be long in a longitudinal direction. An upper end of the sliding link 150 is coupled to the connection link 14, whereas a lower end thereof is provided with a slit 151 in a longitudinal direction and is slidably coupled, in a longitudinal direction, to a fixing bracket 35 fixed to a bottom surface of the carriage 30. The rotation lever 160 is rotatably coupled to a lower side of the slit 151 of the sliding link 150.

The rotation lever 160 is formed in a rectangular shape. One end of the rotation lever 160 is rotatably coupled to the sliding link 150, whereas another end thereof is rotatably coupled to the blocking plate 170.

The blocking plate 170 is provided with a connection portion 171 in a longitudinal direction, the connection portion having one end rotatably coupled to the rotation lever 160. At a lower end of the connection portion 171, a blocking portion 172 is formed to be long in a horizontal direction so as to be detachably mounted at a blocking recess 33a to be later explained. At the blocking portion 172, formed are sliding holes 173 having a slit shape and slidably coupled to the blocking portion 172 in a horizontal direction with respect to the carriage 30, i.e., a direction perpendicular to a moving direction of the carriage 30.

As shown in FIGS. 1 and 2, the carriage 30 includes a body portion 31 on which the breaker body 3 is loaded, and a girder portion 32 configured to move the breaker body 3 to a 'TEST' position and a 'RUN' position in a sliding manner. Between the body portion 31 and the girder portion 32, installed is a transfer rail 33 along which the body portion 31 is moveable. At an intermediate part of the transfer rail 33, formed is a blocking recess 33a configured to selectively restrict the blocking plate 170 in a locking manner. The blocking recess 33a may not be necessarily formed at an intermediate part of the transfer rail 33, but may be formed at any part of the body portion 31.

The plug interlock device for a circuit breaker according to the present invention may have the following operation effects.

Figure 5:
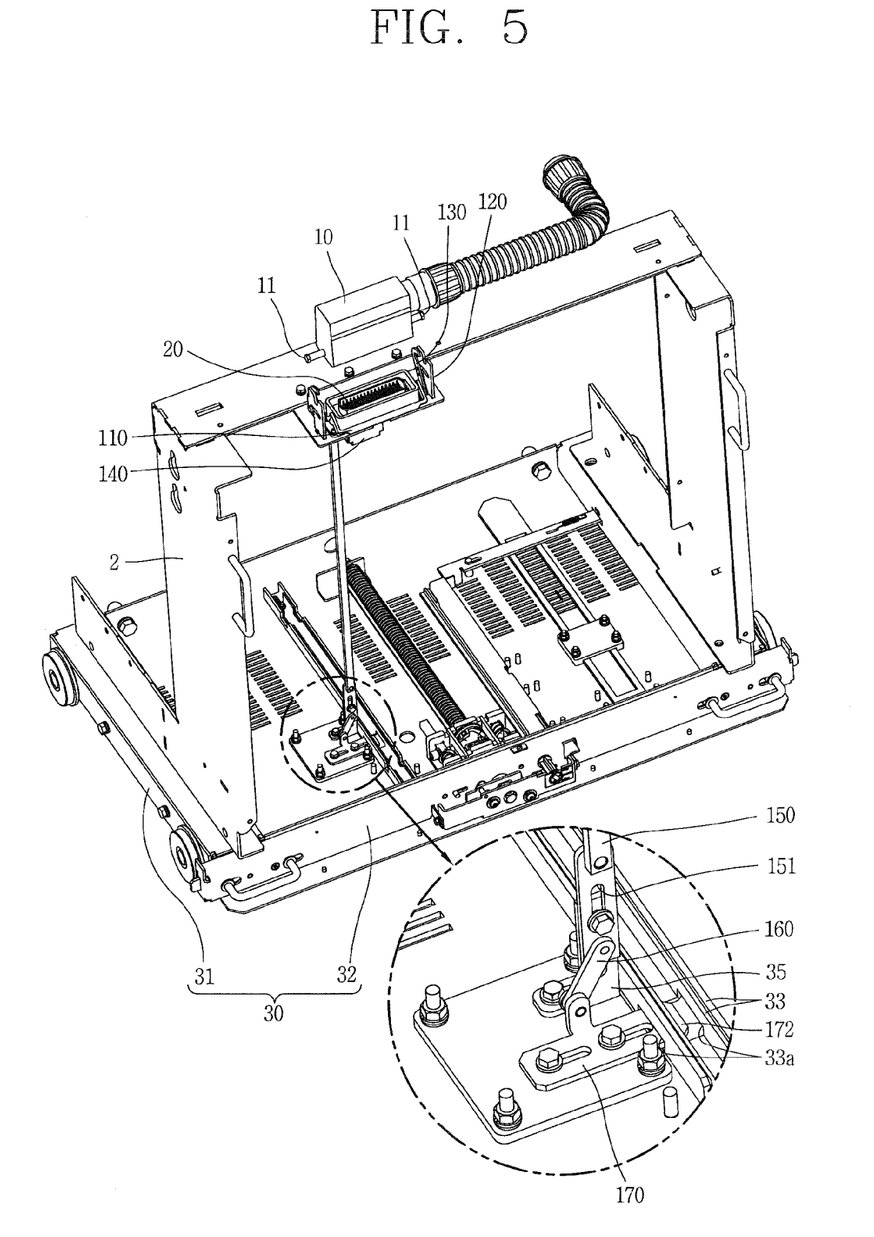
Figure 6:
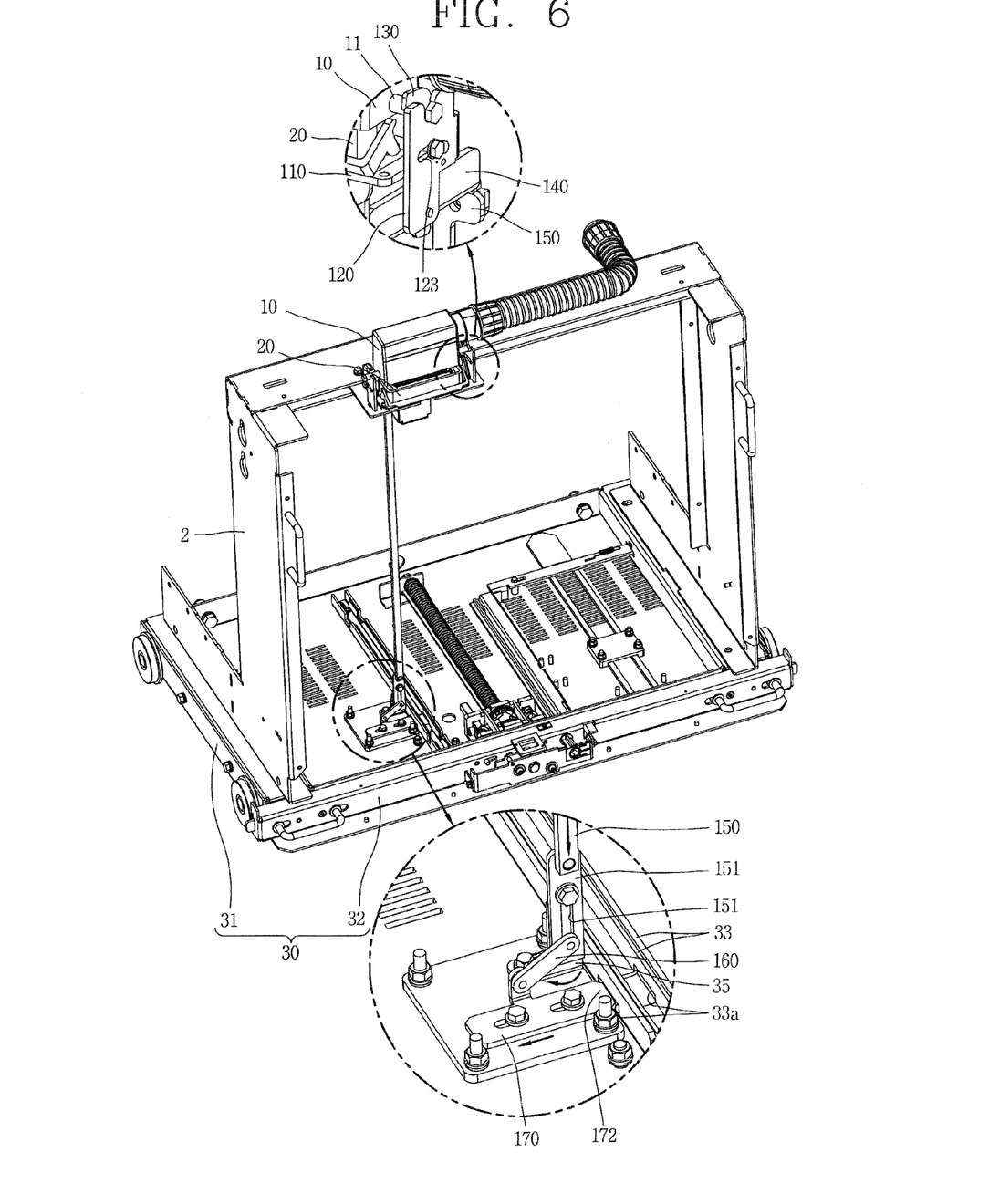

As shown in FIGS. 5 and 6, in a state that the breaker body 3 has been withdrawn from the cradle 2, an operator pushes the body portion 31 towards the cradle 2 from the girder portion 32 with using a handle for insertion and withdrawal (not shown). Then, the breaker body 3 reaches a 'TEST' position, and the plug 10 is inserted into the connector 20 of the breaker body 3. More concretely, as the blocking plate 170 is rotated, the blocking portion 172 is inserted into the blocking recess 33a of the transfer rail 33. As a result, the pin recesses 121 of the plug brackets 120 are open, and an operator may connect the plug 10 to the connector 20. Then, the plug brackets 120 are lowered by a force to press the plug 10, and the connection link 140 and the sliding link 150 are lowered by the lowered degree of the plug brackets 120. As a result, the rotation lever 160 is rotated in a clockwise direction, i.e., a direction that the blocking plate 170 is separated from the blocking recess 33a. Then, the blocking plate 170 hinge-coupled to the rotation lever 160 is slid with respect to the carriage 30, and the blocking portion 172 is separated from the blocking recess 33a. As a result, the body portion 31 can move more toward the cradle 2 since a restricted state thereof has been released. Here, the locking latches 130 are rotated in a direction to lock the pins 11 of the plug 10 by guiding recesses (not shown) of the fixing plate 110, with downwardly moving along the plug brackets 120, thereby preventing the plug 10 from being separated from the connector 20.

Figure 7:
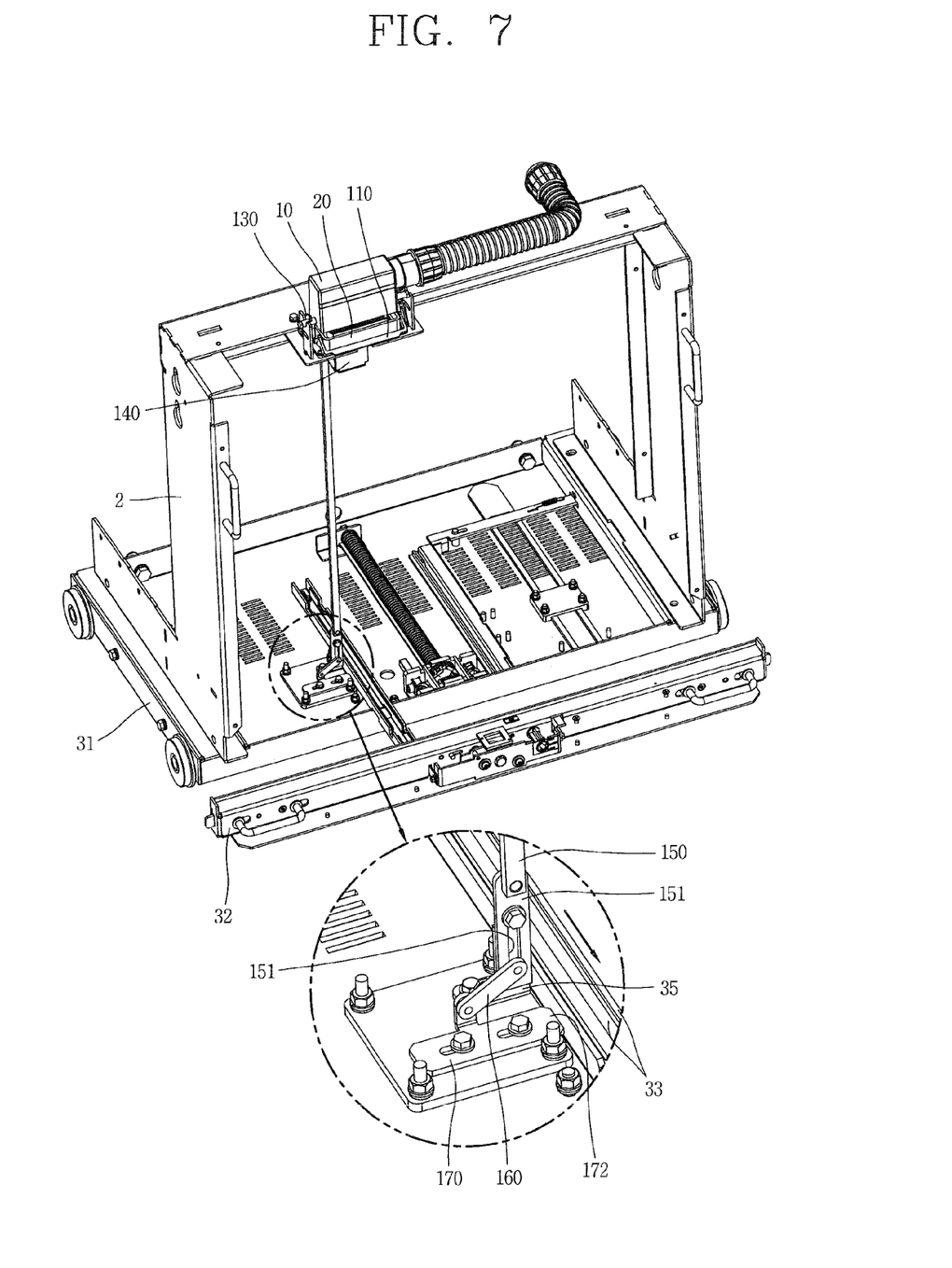

As shown in FIG. 7, once the operator moves the breaker body 3 to a 'RUN' position with using the handle for insertion and withdrawal, the locking latches 130 lock the pins 11 of the plug 10. Accordingly, the plug 10 is not separated from the connector 20 while the breaker body 3 moves to a 'RUN' position. That is, the blocking portion 172 of the blocking plate 170 is inserted into the blocking recess 33a at a 'TEST' position of the breaker body 3, so that the locking latches 130 open the pin recesses 121 of the plug brackets 120. However, once the breaker body 3 is out of the 'TEST' position, the blocking plate 170 is locked by side surfaces of the transfer rail 33. Accordingly, the rotation lever 160 is not rotated in a counterclockwise direction, and thus the sliding link 150 is not upwardly moved. Then, the plug brackets 120 maintain a downwardly-moved state by the connection link 140, the sliding link 150 and the rotation lever 160. As a result, the locking latches 130 lock the pins 11 of the plug 10 and maintain this locking state.

This state is maintained while the breaker body 3 is moved to a 'TEST' position from a 'RUN' position, as well as while the breaker body 3 is in a 'RUN' position.

When the breaker body 3 is moved to a 'RUN' position from a 'TEST' position, or when an operation is performed at a 'RUN' position, the plug is not separated from the connector. As a result, when the breaker body 3 is moved to a 'RUN' position from a 'TEST' position, or when an operation is performed, the control power plug may be prevented from being disconnected from the control power connector.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A plug interlock device for a vacuum circuit breaker, the device comprising:
    a switchboard having a control power plug;
    a breaker body having a control power connector for detachably connecting the control power plug, and having terminals for receiving a voltage and a current;
    a cradle installed at the switchboard, and having terminals connected to or disconnected from the terminals of the breaker body;
    a carriage on which the breaker body is located, and slidably installed at the cradle; and
    a carriage restriction unit configured to selectively restrict motion of the carriage by interworking with an operation to insert the control power plug into or separate the control power plug from the control power connector,
    wherein the carriage restriction unit comprises:
    a link configured to move up and down along an insertion or separation direction of the control power plug; and
    a blocking plate coupled to the link in order to interwork with the link, and configured to restrict the motion of the carriage or release a restricted state of the carriage by moving in a direction perpendicular to a moving direction of the carriage,
    wherein the link is provided with a slit in a moving direction of the link, and the link is slidably coupled to the carriage according to a coupled state between the control power plug and the control power connector, and
    wherein sliding holes having a slit shape are formed at the blocking plate such that the blocking plate is slidably coupled to the carriage in a direction perpendicular to a moving direction of the carriage.

2. The plug interlock device for a vacuum circuit breaker of claim 1, wherein:
    a rotation lever configured to linearly move the blocking plate by being rotated in a forward direction or a backward direction with respect to the moving direction of the link is provided between the link and the blocking plate; and
    one end of the rotation lever is rotatably coupled to the link and another end of the rotation lever is rotatably coupled to the blocking plate.

3. The plug interlock device for a vacuum circuit breaker of claim 1, wherein:
    the blocking plate is provided with a connection portion in a longitudinal direction, the connection portion having one end rotatably coupled to the rotation lever; and
    a blocking portion is formed at a lower end of the connection portion in a horizontal direction such that the blocking portion is detachably mounted at the carriage.

4. The plug interlock device for a vacuum circuit breaker of claim 1, wherein the carriage comprises:
    a body portion on which the breaker body is loaded; and
    a girder portion configured to move the breaker body to a proper position,
    wherein a transfer rail along which the body portion is moveable is installed between the body portion and the girder portion, and
    wherein a blocking recess configured to restrict a motion of the body portion of the carriage or release the restricted state by detachably mounting the blocking plate is formed at the transfer rail.

5. The plug interlock device for a vacuum circuit breaker of claim 1, further comprising a plug restriction unit formed between the control power plug and the control power connector, and configured to restrict separation of the control power plug from the control power connector.

6. The plug interlock device for a vacuum circuit breaker of claim 5, wherein the plug restriction unit comprises:
   plug brackets moving in a longitudinal direction with respect to the breaker body; and
   locking latches rotatably coupled to the plug brackets, and selectively locking pins of the control power plug.

7. The plug interlock device for a vacuum circuit breaker of claim 6, wherein the link is coupled to the plug brackets so as to be moveable in an insertion direction of the control power plug by interworking with the plug brackets.

8. A plug interlock device for a vacuum circuit breaker, the device comprising:
   a switchboard having a control power plug;
   a breaker body having a control power connector for detachably connecting the control power plug, and having terminals for receiving a voltage and a current;
   a cradle installed at the switchboard, and having terminals connected to or disconnected from the terminals of the breaker body;
   a carriage on which the breaker body is located, and slidably installed at the cradle;
   a fixing plate fixedly installed at the breaker body, and configured to support the control power connector;
   one or more plug brackets coupled to both sides of the fixing plate such that the one or more plug brackets are moveable in an insertion direction of the control power plug;
   one or more locking latches rotatably coupled to the plug brackets, and configured to lock pins of the control power plug;
   a connection link coupled to the one or more plug brackets and configured to move together with the one or more plug brackets;
   a sliding link configured to move in a longitudinal direction according to the connection link;
   a rotation lever rotatably coupled to the sliding link and configured to rotate in an opposite direction to the moving direction of the sliding link; and
   a blocking plate rotatably coupled to the rotation lever, and configured to restrict motion of the carriage or release a restricted state by moving in a direction perpendicular to a moving direction of the carriage according to a rotation direction of the rotation lever,
   wherein guiding recesses or guiding protrusions are formed at both side surfaces of the fixing plate such that the one or more locking latches are slidably inserted into the guiding recesses or guiding protrusions in order to rotate by sliding in a longitudinal direction.

9. The plug interlock device for a vacuum circuit breaker of claim 8, wherein:
   pin recesses configured to insert the pins of the control power plug are formed on upper surfaces of the one or more plug brackets; and
   hinge holes configured to rotatably couple the one or more locking latches are formed on lower surfaces of the one or more plug brackets.

10. The plug interlock device for a vacuum circuit breaker of claim 9, wherein sliding holes configured to restrict a rotation angle of the one or more locking latches such that the one or more locking latches rotate within a constant angle are formed at an intermediate part between the pin recesses and the hinge holes.

11. The plug interlock device for a vacuum circuit breaker of claim 9, wherein the one or more locking latches are rotatably coupled to the hinge holes and are slidably coupled to the sliding holes.

* * * * *